(12) United States Patent
Kim et al.

(10) Patent No.: US 8,871,875 B2
(45) Date of Patent: Oct. 28, 2014

(54) POLYCARBONATE RESIN AND THERMOPLASTIC RESIN COMPOSITION INCLUDING POLYCARBONATE RESIN

(71) Applicant: Cheil Industries Inc., Gumi-si (KR)

(72) Inventors: Mie Ock Kim, Anyang-si (KR); Jin Yong Bae, Yeosu-si (KR); O Sung Kwon, Gunpo-si (KR); Bok Nam Jang, Anyang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/887,348

(22) Filed: May 5, 2013

(65) Prior Publication Data
US 2014/0148559 A1 May 29, 2014

Related U.S. Application Data

(63) Continuation-in-part of application No. PCT/KR2010/009595, filed on Dec. 30, 2010.

(30) Foreign Application Priority Data

Nov. 5, 2010 (KR) .................. 10-2010-0109520

(51) Int. Cl.
C08F 283/00 (2006.01)
C08G 77/50 (2006.01)
C08L 69/00 (2006.01)
C08G 77/448 (2006.01)
C08G 64/18 (2006.01)
C08L 83/10 (2006.01)
C08F 283/02 (2006.01)

(52) U.S. Cl.
CPC .............. C08G 77/50 (2013.01); C08L 69/00 (2013.01); C08G 77/448 (2013.01); C08G 64/186 (2013.01); C08L 83/10 (2013.01)
USPC ........................................ 525/464

(58) Field of Classification Search
USPC ........................................ 525/464
See application file for complete search history.

(56) References Cited

U.S. PATENT DOCUMENTS

| 4,188,314 A | 2/1980 | Fox et al. |
| 4,634,737 A | 1/1987 | Liu et al. |
| 5,401,826 A | 3/1995 | Sakashita et al. |
| 5,767,219 A | 6/1998 | Takarada et al. |
| 6,072,011 A | 6/2000 | Hoover |
| 6,080,829 A | 6/2000 | Tapsak et al. |
| 6,414,175 B1 | 7/2002 | Burkhart et al. |
| 6,437,073 B1 | 8/2002 | Gunatillake et al. |
| 6,984,700 B2 | 1/2006 | Benz et al. |
| 8,389,662 B2 * | 3/2013 | de Brouwer et al. ........... 528/26 |
| 2008/0029744 A1 | 2/2008 | Jansen et al. |

FOREIGN PATENT DOCUMENTS

| KR | 2006-0058195 A | 5/2006 |
| KR | 2007-0071592 A | 7/2007 |
| KR | 2009-0035031 A | 4/2009 |
| WO | 99/50327 A1 | 10/1999 |
| WO | 2004/026935 A1 | 4/2004 |
| WO | 2012/060516 A1 | 5/2012 |

OTHER PUBLICATIONS

Kim et al., "Synthesis and Properties of Allyl-Terminated and Silicon-Containing Polycarbonates", Macromolecules, 1999, vol. 32, pp. 6363-6366.
International Search Report in counterpart International Application No. PCT/KR2010/009595 dated Dec. 21, 2011, pp. 1-4.

* cited by examiner

Primary Examiner — Terressa Boykin
(74) Attorney, Agent, or Firm — Additon, Higgins & Pendleton, P.A.

(57) ABSTRACT

A polycarbonate resin includes a repeating unit in its main chain of the following Chemical Formula 1:

<Chemical Formula 1>

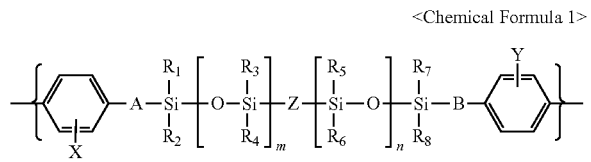

wherein the substituents are as defined in the specification.

17 Claims, No Drawings

POLYCARBONATE RESIN AND THERMOPLASTIC RESIN COMPOSITION INCLUDING POLYCARBONATE RESIN

CROSS-REFERENCE TO RELATED APPLICATIONS

This application is a continuation-in-part of International Application No. PCT/KR2010/009595, filed Dec. 30, 2010, pending, which designates the U.S., published as WO 2012/060516, and is incorporated herein by reference in its entirety, and claims priority therefrom under 35 USC Section 120. This application also claims priority under 35 USC Section 119 from Korean Patent Application No. 10-2010-0109520, filed Nov. 5, 2010, the entire disclosure of which is also incorporated herein by reference.

FIELD OF THE INVENTION

The present invention relates to a polycarbonate resin.

BACKGROUND OF THE INVENTION

Polycarbonate is a thermoplastic resin having an aromatic polycarbonate ester with excellent mechanical properties, self-extinguishing property, dimensional stability, thermostability and transparency. Due to these excellent properties, polycarbonate has become an exemplary engineering plastic, with increasing use in the visible parts of electrical and electronic products, optical discs, automobile parts and the like.

The scope of use of polycarbonate has further increased recently. Research is being carried out to improve the properties of polycarbonate and to use polycarbonate in a variety of fields.

For example, there has been research directed to the modification of the properties of polycarbonate by copolymerization of more than two types of diols having different structures and by including polymers, the structures of which are different from the diols, in the main chain of the polycarbonate. For example, Korean patent application No. 2009-0035031 is directed to a resin composition stated to improve the chemical resistance and the fire retardant property of a polycarbonate by copolymerization of a specific structure with the polycarbonate.

Much research has focused on efforts to improve the limited chemical resistance of polycarbonate. There have also been efforts to address the problem of impairment of its mechanical properties due to the penetration of diluent solvents inside a paint while coating, if a polycarbonate resin is being used as a visible part of electrical and electronic products. In order to solve the problem of impairment of mechanical properties of the polycarbonate, efforts have been made to improve the physical properties of the polycarbonate by blending the polycarbonate with other thermoplastic resins.

Although the chemical resistance of the blended polycarbonate can be improved, the impact resistance or transparency may not be improved. For example, U.S. Pat. No. 4,188,314 is directed to an article of polycarbonate and copolyester having improved chemical resistance, but sufficient impact strength could not be obtained by the method used therein. U.S. Pat. No. 4,634,737 is directed to a resin composition including a copolyester-carbonate ester containing about 25 to about 90 mole percent ester bonds, a polyester and an olefinic polymer, such as an olefin acrylate copolymer. This composition can exhibit improved chemical resistance but exhibits very low transparency.

There have also been efforts to improve the chemical resistance in the main chain of the polycarbonate by introduction of another polymer. For example, research on a polycarbonate comprising a polysiloxane structure has been undertaken. In Korean patent application Nos. 2006-0058195 and 2007-0071592, the chemical resistance of the polycarbonate was attempted to be improved by blending the same with a polyester or polysulfone resin. An improvement in the polycarbonate was obtained by including the copolymer of a specific chemical structure into the polycarbonate in U.S. Pat. No. 5,401,826. However, in this case as well, although the chemical resistance and impact resistance were improved, there was an impairment of the transparency.

Accordingly there is a need for a polycarbonate resin with excellent impact strength, chemical resistance and transparency.

SUMMARY OF THE INVENTION

The present invention provides a polycarbonate resin that can have excellent impact strength and chemical resistance. The present invention also provides a polycarbonate resin that can have excellently high transparency as well as excellent impact strength and chemical resistance. The present invention also provides a product formed from this resin composition.

To resolve the aforesaid technological problems, the present invention provides a polycarbonate resin which comprises a repeating unit of the following Chemical Formula 1 in its main chain:

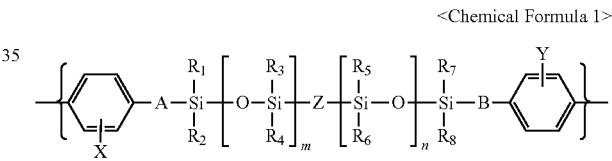

<Chemical Formula 1> wherein, in Chemical Formula 1, $R_1$ to $R_8$ are the same or different and are each independently substituted or unsubstituted $C_1$-$C_{10}$ alkyl or substituted or unsubstituted $C_6$-$C_{18}$ aryl, wherein the substituted $C_1$-$C_{10}$ alkyl or substituted $C_6$-$C_{18}$ aryl is substituted with $C_1$-$C_{10}$ alkyl, $C_6$-$C_{18}$ aryl, halogen, $C_1$-$C_{10}$ alkoxy or a combination thereof;

A and B are the same or different and are each independently $C_1$-$C_{10}$ alkylene, $C_6$-$C_{18}$ arylene, —O— or —S—;

Z is substituted or unsubstituted $C_1$-$C_{18}$ alkylene, substituted or unsubstituted $C_6$-$C_{18}$ cycloalkylene, or substituted or unsubstituted $C_6$-$C_{18}$ arylene;

X and Y are the same or different and are each independently hydrogen, halogen, $C_1$-$C_{18}$ alkoxy, $C_1$-$C_{10}$ alkyl, or $C_6$-$C_{18}$ aryl; and n and m are positive integers, where n+m is an integer having a value from 8 to 100.

In an embodiment of the present invention, the polycarbonate resin can include the repeating unit of Chemical Formula 1 in an amount of about 2.8 to about 3.4% by weight, based on the total weight of the polycarbonate resin.

In another embodiment of the present invention, the polycarbonate resin can have a Si content from about 4.7 to about 4.9% by weight, based on the total weight of the polycarbonate resin.

In yet another embodiment of the present invention, the polycarbonate resin can include the repeating unit of Chemical Formula 1 in an amount of about 2.3 to about 2.5% by weight, based on the total weight of the polycarbonate resin, and at the same time, the polycarbonate resin can have a Si content from about 5.5 to about 7.0% by weight, based on the total weight of the polycarbonate resin.

In Chemical Formula 1, the substituents can be substituted with $C_1$-$C_6$ alkyl, $C_6$-$C_{18}$ aryl, halogen, or a combination thereof, for example $C_1$-$C_6$ alkyl, and as another example $C_1$-$C_3$ alkyl, unless otherwise defined.

In the Si—Z—Si bond of Chemical Formula 1, Si can be either bound to the Z group or can be bound to a substituent which is included in the Z group.

In Chemical Formula 1, X and Y are each independently hydrogen, halogen, $C_1$-$C_{18}$ alkoxy, $C_1$-$C_{10}$ alkyl, or $C_6$-$C_{18}$ aryl, for example, H or $C_1$-$C_3$ alkoxy, and as another example hydrogen or methoxy. In exemplary embodiments, one to four of each of X and Y can be independently present in the benzene moiety, for example one to two of each of X and Y can be independently present in the benzene moiety. Each X and Y can be independently bound at any one of the positions among the positions 2, 3, 5, and 6 of the benzene moiety.

In exemplary embodiments X and Y can be bound at position 3 in the benzene structure.

In Chemical Formula 1, Z is a substituted or unsubstituted $C_1$-$C_{18}$ alkylene, substituted or unsubstituted $C_6$-$C_{18}$ cycloalkylene, or substituted or unsubstituted $C_6$-$C_{18}$ arylene. In exemplary embodiments, Z can be substituted or unsubstituted $C_1$-$C_{10}$ alkylene, substituted or unsubstituted $C_6$-$C_{10}$ cycloalkylene, or substituted or unsubstituted $C_6$-$C_{10}$ arylene.

In a compound including a repeating unit of Chemical Formula 1, if Z is $C_6$-$C_{12}$ cycloalkylene, then a specimen thereof with a thickness of ¼" can have a notched IZOD impact strength of about 60 to about 90 kgf·cm/cm measured in accordance with ASTM D256.

In a compound including a repeating unit of Chemical Formula 1, if Z is $C_1$-$C_{10}$ alkylene, then a specimen thereof extruded with a thickness of 2.5 mm can have a Haze (Hz) measured by a Haze meter from about 0.1 to about 10%, and a Total Transmitted Light (TT) from about 85 to about 99%.

In a compound including a repeating unit of Chemical Formula 1, if Z is $C_6$-$C_{18}$ arylene, then a dumbbell specimen thereof can exhibit a change in tensile strength before and after immersing into gasoline for seven days of about 0 (i.e. 0 or about 0) to about 25% as measured in accordance with ASTM No. 1.

The present invention also provides a polycarbonate resin composition comprising a polycarbonate resin in accordance with the present invention and a polycarbonate resin excluding Si. The weight ratio of the polycarbonate resin with Si and the polycarbonate resin without Si can range from about 40:60 to about 60:40.

The present invention further provides a thermoplastic resin composition including the polycarbonate resin including a repeating unit of Chemical Formula 1, optionally a polycarbonate resin excluding Si, and further optionally including one or more additives, as well as a product formed from the thermoplastic resin composition.

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to a polycarbonate resin that can have excellent impact strength, chemical resistance, and/or transparency and a thermoplastic resin composition including the same.

The present invention also relates to a polycarbonate resin that can have excellent impact strength and high transparency while providing chemical resistance to an organic solvent by introducing a polysiloxane repeating unit into a main chain of the polycarbonate.

In the conventional technology of providing improved chemical resistance and impact strength to a polycarbonate resin, there were problems of transparency impairment even if the chemical resistance and impact strength were improved. The present invention is directed to a polycarbonate resin composition that can have improved chemical resistance and impact strength while maintaining transparency. This can be achieved by introducing a siloxane polymer having a specific chemical strength that can improve the chemical resistance and impact strength into the main chain of the polycarbonate.

The present invention is carried out by introducing a repeating unit represented by Chemical Formula 1 below into the main chain of a polycarbonate resin:

<Chemical Formula 1>

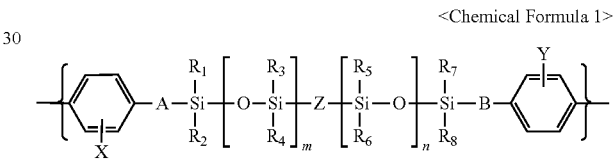

wherein:

$R_1$ to $R_8$ are the same or different and are each independently substituted or unsubstituted $C_1$-$C_{10}$ alkyl or substituted or unsubstituted $C_6$-$C_{18}$ aryl, wherein the substituted $C_1$-$C_{10}$ alkyl or substituted $C_6$-$C_{18}$ aryl is substituted by $C_1$-$C_{10}$ alkyl, $C_6$-$C_{18}$ aryl, halogen, $C_1$-$C_{10}$ alkoxy or a combination thereof;

A and B are the same or different and are each independently $C_1$-$C_{10}$ alkylene, $C_6$-$C_{18}$ arylene, —O—, or —S—;

Z is substituted or unsubstituted $C_1$-$C_{18}$ alkylene, substituted or unsubstituted $C_6$-$C_{18}$ cycloalkylene, or substituted or unsubstituted $C_6$-$C_{18}$ arylene;

X and Y are the same or different and are each independently hydrogen, halogen, $C_1$-$C_{18}$ alkoxy, $C_1$-$C_{10}$ alkyl, or $C_6$-$C_{18}$ aryl; and n and m are positive integers, wherein n+m is an integer having a value of 8 to 100.

In exemplary embodiments of the present invention, the polycarbonate resin can include a repeating unit represented by Chemical Formula 1 in an amount of about 2.8 to about 3.4% by weight, based on the total weight of the polycarbonate resin.

In exemplary embodiments of the present invention, the polycarbonate resin can include Si in an amount of about 4.7 to about 4.9% by weight, based on the total of the polycarbonate resin.

In exemplary embodiments of the present invention, the polycarbonate resin can include a repeating unit represented by Chemical Formula 1 in an amount of about 2.3 to about 2.5% by weight, based on the total weight of the polycarbonate resin, and the Si content can be from about 5.5 to about 7.0% by weight, based on the total weight of the polycarbonate resin.

In Chemical Formula 1, the substituents can be substituted with $C_1$-$C_6$ alkyl, $C_6$-$C_{18}$ aryl, halogen, or a combination thereof, for example $C_1$-$C_6$ alkyl, and as another example $C_1$-$C_3$ alkyl, unless otherwise defined.

In the Si—Z—Si bond of Chemical Formula 1, Si can be bound either to the Z group or can be bound to a substituent which is included in the Z group.

X and Y are independently hydrogen, halogen, $C_1$-$C_{18}$ alkoxy, $C_1$-$C_{10}$ alkyl, or $C_6$-$C_{18}$ aryl. For example, X and Y can be independently hydrogen or $C_1$-$C_3$ alkoxy, and as another example hydrogen or methoxy. In exemplary embodiments, one to four, for example one to two, of each of X and Y can be independently present in the benzene moiety. Each X and Y each can be independently bound at any position among the positions 2, 3, 5, and 6 of the benzene moiety. In exemplary embodiments, X and Y each can be bound at position 3 of the benzene moiety.

In Chemical Formula 1, Z is substituted or unsubstituted $C_1$-$C_{18}$ alkylene, substituted or unsubstituted $C_6$-$C_{18}$ cycloalkylene, or substituted or unsubstituted $C_6$-$C_{18}$ arylene. In exemplary embodiments, Z can be substituted or unsubstituted $C_1$-$C_{10}$ alkylene, substituted or unsubstituted $C_6$-$C_{10}$ cycloalkylene, or substituted or unsubstituted $C_6$-$C_{10}$ arylene.

In a compound including a repeating unit of Chemical Formula 1, if Z is $C_6$-$C_{12}$ cycloalkylene, then a specimen formed thereof with a thickness ¼" can have a notched IZOD impact strength of about 60 to about 90 kgf·cm/cm measured in accordance with ASTM D256.

In a compound including a repeating unit of Chemical Formula 1, if Z is linear $C_1$-$C_{10}$ alkylene, then a specimen formed thereof extruded with a thickness of 2.5 mm can have a haze (Hz) from about 0.1 to about 10%, measured by a Haze meter and a Total Transmittance of light (TT) from about 85 to about 99%.

In a compound of Chemical Formula 1, if Z is $C_6$-$C_{18}$ arylene, then a dumbbell shaped test specimen formed thereof can exhibit a change in tensile strength before and after immersing into gasoline for seven days from about 0 to about 25% as measured in accordance with ASTM No. 1.

A polycarbonate resin including a repeating unit of Chemical Formula 1 in which a polysiloxane repeating unit can be included can be manufactured by reacting one or more compounds selected from the group consisting of diphenols, which can be represented by Chemical Formula 2 below, phosgene, ester, and carbonate:

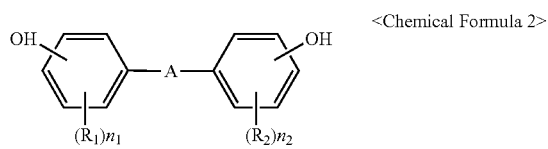

<Chemical Formula 2>

In Chemical Formula 2, A is a connecting group comprising a single bond, substituted or unsubstituted, straight chain or branched $C_1$-$C_{30}$ alkylene, substituted or unsubstituted, straight chain or branched $C_2$-$C_5$ alkylene, substituted or unsubstituted $C_2$-$C_5$ alkylidene, substituted or unsubstituted, straight chain or branched $C_1$-$C_{30}$ haloalkylene, substituted or unsubstituted $C_5$-$C_6$ cycloalkylene, substituted or unsubstituted $C_5$-$C_6$ cycloalkenylene, substituted or unsubstituted $C_5$-$C_{10}$ cycloalkylidene, substituted or unsubstituted $C_6$-$C_{30}$ arylene, substituted or non-substituted, straight chain or branched $C_1$-$C_{20}$ alkoxylene, halogen acid ester group, carbonate group, CO, S, or $SO_2$;

$R_1$ and $R_2$ are the same or different and are independently substituted or unsubstituted $C_1$-$C_{30}$ alkyl or substituted or unsubstituted $C_6$-$C_{30}$ aryl; and $n_1$ and $n_2$ are the same or different and each are independently integers having a value of 0 to 4.

As used in the definition of Chemical Formula 2, the term "substituted" refers to a hydrogen atom substituted by a substituent comprising halogen, $C_1$-$C_{30}$ alkyl, $C_1$-$C_{30}$ haloalkyl, $C_6$-$C_{30}$ aryl, $C_1$-$C_{20}$ alkoxy, or a combination thereof.

The polycarbonate resin can include one, two or more diphenols, such as represented by Chemical Formula 2, in combination to form repeating units of the polycarbonate resin. Examples of the diphenols include without limitation hydroquinone, resorcinol, 4,4'-dihydroxydiphenyl, 2,2-bis(4-hydroxyphenyl)propane (also called as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulphoxide, bis(4-hydroxyphenyl)ketone, bis(4-hydroxyphenyl) ether, and the like, and combinations thereof. In exemplary embodiments, 2,2-bis(4-hydroxyphenyl)propane, 2,2-bis(3,5-dichloro-4-hydroxyphenyl)propane and/or 1,1-bis(4-hydroxyphenyl)cyclohexane can be used, for example, 2,2-bis(4-hydroxyphenyl)propane can be used.

The polycarbonate resin can be a copolymer prepared from two or more types of diphenols. Linear polycarbonate resin, branched polycarbonate resin, polyestercarbonate copolymer resin, and the like, and combinations thereof, can also be used.

Exemplary linear polycarbonate resins include bisphenol-A based polycarbonate resins. Branched polycarbonate resins can be prepared by reacting a multifunctional aromatic compound, such as tremellitic anhydride, tremellitic acid, and the like, with one or more diphenols and carbonate. The multifunctional aromatic compound can be included in an amount of about 0.05 to about 2 mol % based on the total weight of the branched polycarbonate resin. Polycarbonate copolymer resins can be prepared by reacting bifunctional carboxylic acid with one or more diphenols and carbonate. During this reaction, diarylcarbonate, such as diphenyl carbonate, can be used as said carbonate.

The polycarbonate resin in the present invention can be prepared by copolymerization of a siloxane polymer of the following Chemical Formula 3 and one or more diphenols of Chemical Formula 2. Stated differently, the polycarbonate resin of the present invention can be prepared by copolymerization of a compound of Chemical Formula 3 with one or more compounds selected from the group consisting of diphenols of Chemical Formula 2, phosgene, halogen acid esters, carbonates, and combinations thereof.

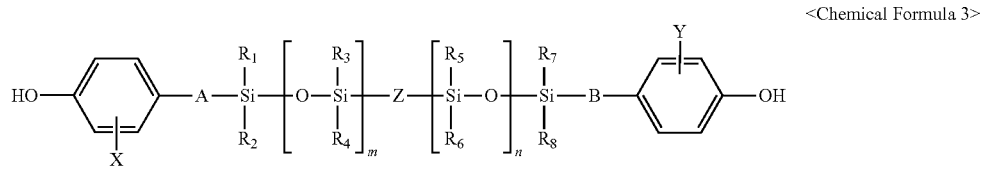

<Chemical Formula 3>

In Chemical Formula, $R_1$-$R_8$ are the same or different and each are independently substituted or unsubstituted $C_1$-$C_{10}$ alkyl or substituted or unsubstituted $C_6$-$C_{18}$ aryl, wherein the substituted $C_1$-$C_{10}$ alkyl or substituted $C_6$-$C_{18}$ aryl is substituted with $C_1$-$C_{10}$ alkyl, $C_6$-$C_{18}$ aryl, halogen, $C_1$-$C_{10}$ alkoxy, or a combination thereof.

A and B are the same or different and each are independently $C_1$-$C_{10}$ alkylene, $C_6$-$C_{18}$ arylene, —O—, or —S—;

Z is substituted or unsubstituted $C_1$-$C_{18}$ alkylene, substituted or unsubstituted $C_6$-$C_{18}$ cycloalkylene, or substituted or unsubstituted $C_6$-$C_{18}$ arylene;

X and Y are the same or different and each are independently hydrogen, halogen, $C_{1\text{-}18}$ alkoxy, $C_1$-$C_{10}$ alkyl, or $C_6$-$C_{18}$ aryl, and n and m are positive integers, and wherein n+m is an integer of 8 to 100.

The method of preparation of siloxane polymer in accordance with the present invention is as given below.

Bis-hydroxyaryl siloxane as an example of a compound of Chemical Formula 3 (Chemical Formula 4 below) can be prepared by first synthesizing a monohydroxy siloxane (Chemical Formula 7) by reacting a hydride terminated siloxane (Chemical Formula 5 below) with one or more phenol derivatives as indicated by Chemical Formula 6 below (the first stage); and then reacting the monohydroxy siloxane with a diene during a second stage:

tuted or unsubstituted $C_1$-$C_{10}$ alkyl or substituted or unsubstituted $C_6$-$C_{18}$ aryl, wherein the substituted $C_1$-$C_{10}$ alkyl or substituted $C_6$-$C_{18}$ aryl is substituted with $C_1$-$C_{10}$ alkyl, $C_6$-$C_{18}$ aryl, halogen, $C_1$-$C_{10}$ alkoxy, or a combination thereof;

A is $C_1$-$C_{10}$ alkylene, $C_6$-$C_{18}$ arylene, —O— or —S—;

B is $C_1$-$C_{10}$ alkyl having a double bond at its terminal, $C_6$-$C_{18}$ aryl having a double bond at its terminal, —O— or —S—;

Z is substituted or unsubstituted $C_1$-$C_{18}$ alkylene, substituted or unsubstituted $C_6$-$C_{18}$ cycloalkylene, or substituted or unsubstituted $C_6$-$C_{18}$ arylene;

Y is hydrogen, halogen, $C_1$-$C_{18}$ alkoxy, $C_1$-$C_{10}$ alkyl or $C_6$-$C_{18}$ aryl, and n is an integer having a value of 4 to 100.

The First Stage

The first stage includes the synthesis of monohydroxy siloxane (Chemical Formula 7) by reacting hydride terminated siloxane (Chemical Formula 5) and phenol derivative (Chemical Formula 6) in the presence of a catalyst.

A catalyst comprising platinum can be used. For example, the catalyst can be a platinum atom itself or a compound containing platinum. Examples of catalysts include without limitation $H_2PtCl_6$, $Pt_2\{[(CH_2\!=\!CH)Me_2Si]_2O\}_3$, $Rh[(cod)_2]BF_4$, $Rh(PPh_3)_4Cl$, Pt/C, and the like, and combinations thereof. In exemplary embodiments, Pt/C catalyst, for example, 10% Pt/C, can be used.

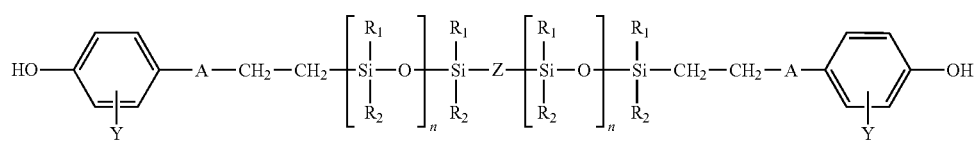

<Chemical Formula 4>

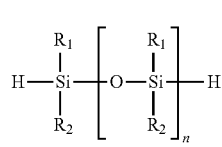

<Chemical Formula 5>

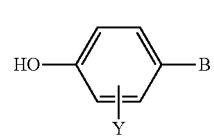

<Chemical Formula 6>

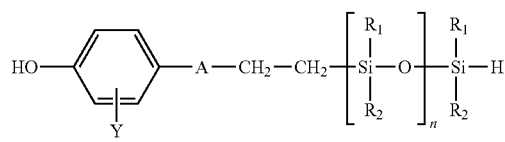

<Chemical Formula 7>

In the above Chemical Formulae 4, 5, 6, and 7, $R_1$ and $R_2$ are the same or different and each are independently substi- The catalyst can be used in an amount of about 10 to about 500 ppm, for example, about 50 to about 150 ppm.

The reaction can be carried out in an organic solvent. Examples of organic solvent can include without limitation 1,2-dichloroethane, toluene, xylene, dichlorobenzene, and the like, and combinations thereof. In exemplary embodiments, the reaction can be carried out in toluene.

The reaction temperature and time can be adjusted according to the reactivity of the compounds of Chemical Formula 5 and Chemical Formula 6. For example, the reaction can be carried out at a reaction temperature of about 60 to about 140° C., for example about 110 to about 120° C., for a reaction time of about 2 to about 12 hours, for example about 3 to about 5 hours.

The compound of Chemical Formula 7 prepared in stage 1 can be purified and used during the next stage or can be used in situ during the next stage without additional purification.

The Second Stage

The second stage is the preparation stage of bis-hydroxyaryl siloxane, by reacting monohydroxy siloxane (Chemical Formula 7) with diene.

The diene can be a diene containing substituted or unsubstituted $C_1$-$C_{18}$ alkyl, substituted or unsubstituted $C_6$-$C_{18}$ cycloalkyl, $C_1$-$C_{18}$ choloralkyl or $C_6$-$C_{18}$ aryl. In exemplary embodiments, the term substituted as used in reference to the diene substituents can include $C_1$-$C_6$ alkyl, $C_6$-$C_{18}$ aryl, halogen, or a combination thereof, for example $C_1$-$C_6$ alkyl, and as another example $C_1$-$C_3$ alkyl.

After completing the first stage of the reaction, bis-hydroxyaryl siloxane can be prepared by reacting the compound of Chemical Formula 7 in situ after adding diene without a purification process.

The reaction temperature and time of the reaction of the monohydroxy aryl siloxane and diene can be adjusted. For example, the reaction temperature and time used during the first stage of the reaction can be used in the second stage but it is not limited to this range.

The prepared bis-hydroxyaryl siloxane can be purified and recovered using conventional methods. For example, the reactant can filtered after completion of the second stage of the reaction to remove the catalyst. By concentrating the obtained filtrate to remove the reaction solvent and low molecular by-product, bis-hydroxyaryl siloxane (Chemical Formula 4) can be recovered. Depending on the purity of bis-hydroxyaryl siloxane, additional purification can be carried out.

In the polycarbonate resin of the present invention, a siloxane moiety and Z of Chemical Formula 1 are introduced, and thus modification is possible inside the chain of the siloxane polymer moiety. It is possible to adjust the physical properties of the polycarbonate resin, making it suitable for various applications, by adjusting Z. For example, if Z is arylene, the transparency and chemical resistance can be improved as compared to the linear alkylene.

The polycarbonate resin can include the repeating unit of Chemical Formula 1 in an amount of about 1 to about 20% by weight, based on the total weight of the polycarbonate resin. In some embodiments, the polycarbonate resin can include the repeating unit of Chemical Formula 1 in an amount of about 1, 2, 3, 4, 5, 6, 7, 8, 9, 10, 11, 12, 13, 14, 15, 16, 17, 18, 19, or 20% by weight, based on the total weight of the polycarbonate resin. Further, according to some embodiments of the present invention, the repeating unit of Chemical Formula 1 may be present in an amount of from about any of the foregoing amounts to about any other of the foregoing amounts.

By adjusting the amount of polysiloxane as indicated by Chemical Formula 1 among the entire polycarbonate resin, the transparency and impact characteristics can be regulated. However, although the impact strength of the resin can be excellent when the polycarbonate resin includes the repeating unit of Chemical Formula 1 in an amount greater than about 20% by weight, it can be difficult to ensure transparency.

Also, the polycarbonate resin can include Si in an amount of about 0.3 to about 10% by weight, based on the total weight of the polycarbonate resin. In some embodiments, the polycarbonate resin can include Si in an amount of about 0.3, 0.4, 0.5, 0.6, 0.7, 0.8, 0.9, 1, 2, 3, 4, 5, 6, 7, 8, 9, or 10% by weight, based on the total weight of the polycarbonate resin. Further, according to some embodiments of the present invention, Si may be present in an amount of from about any of the foregoing amounts to about any other of the foregoing amounts.

It is possible to adjust the transparency and the impact strength by adjusting the Si amount of the total polycarbonate resin.

In exemplary embodiments, the polycarbonate resin can include the repeating unit of Chemical Formula 1 in an amount of about 1.0 to about 13% by weight, based on the total weight of the polycarbonate resin. At the same time, the polycarbonate resin can include Si in an amount of about 0.3 to about 7% by weight, based on the total weight of the polycarbonate resin. When the polycarbonate resin includes the repeating unit of Chemical Formula 1 and/or Si in an amount within the above ranges, a polycarbonate resin with good impact strength and transparency can be obtained.

In exemplary embodiments, m can be an integer of 1 to 60 and n can be an integer of 1 to 60. For example, m+n can be an integer of 8 to 100. It is possible to balance impact strength and transparency by adjusting the chain length of the polysiloxane moiety that is present on both sides of Z.

The weight average molecular weight (Mw) of the polycarbonate resin in accordance with the present invention can be about 10,000 to about 200,000, for example about 20,000 to about 50,000.

The present invention also provides a polycarbonate resin composition including a polycarbonate resin according to the invention including a repeating unit of Chemical Formula 1 as defined herein and a polycarbonate resin without Si. The weight ratio of the polycarbonate resin including a repeating unit of Chemical Formula 1 and a polycarbonate resin not including Si can range from about 40:60 to about 60:40.

In some embodiments, the polycarbonate resin composition including a polycarbonate resin including a repeating unit of Chemical Formula 1 and a polycarbonate resin without Si can include a polycarbonate resin including a repeating unit of Chemical Formula 1 in an amount of about 40, 41, 42, 43, 44, 45, 46, 47, 48, 49, 50, 51, 52, 53, 54, 55, 56, 57, 58, 59, or 60% by weight, based on the total weight (100% by weight) of the polycarbonate resins. Further, according to some embodiments of the present invention, the polycarbonate resin including a repeating unit of Chemical Formula 1 may be present in an amount of from about any of the foregoing amounts to about any other of the foregoing amounts.

In some embodiments, the polycarbonate resin composition including a polycarbonate resin including a repeating unit of Chemical Formula 1 and a polycarbonate resin without Si can include a polycarbonate resin without Si in an amount of about 40, 41, 42, 43, 44, 45, 46, 47, 48, 49, 50, 51, 52, 53, 54, 55, 56, 57, 58, 59, or 60% by weight, based on the total weight (100% by weight) of the polycarbonate resins. Further, according to some embodiments of the present invention, the polycarbonate resin without Si may be present in an amount of from about any of the foregoing amounts to about any other of the foregoing amounts.

The thermoplastic resin composition can optionally include one or more additives. Examples of the additives can include without limitation antioxidants, lubricants, reinforcing agents, fillers, inorganic additives, pigments, dyes, and the like, and combinations thereof. Suitable additives can be readily selected by the skilled artisan based on the application and properties for the composition.

If Z of the repeating unit of Chemical Formula 1 is $C_6$-$C_{12}$ cycloalkylene, then a thermoplastic resin composition of the present invention can have excellent impact strength. For example, a specimen formed of the composition with a thickness ¼" can have a notched IZOD impact strength of about 60 to about 90 kgf·cm/cm measured in accordance with ASTM D256.

If Z of the repeating unit of Chemical Formula 1 is linear $C_1$-$C_{10}$ alkylene, then a thermoplastic resin composition of the present invention can have excellent transparency. For example, a specimen thereof extruded at a thickness of 2.5 mm can have a haze (Hz) measured by a Haze meter of about 0.1 to about 10% and a Total Transmitted Light (TT) of about 85 to about 99%.

If Z of the repeating unit of Chemical Formula 1 is $C_6$-$C_{18}$ arylene, then the thermoplastic resin composition can have excellent chemical resistance. For example, a dumbbell specimen thereof can exhibit a change of tensile before and after immersing it into gasoline for seven days can be about 25% or less, as measured in accordance with ASTM No. 1.

A formed product prepared from the thermoplastic resin composition can have high impact strength, chemical resistance and high transparency.

The present invention can be more easily understood with the following examples. The following examples are provided to exemplify the present invention and not intended to limit the scope of protection which is sought by the scope of the attached claims.

EXAMPLES A-F

The substituents of Chemical Formula 1 in the siloxane polymers A, B, C, D, E, and F are as below.

TABLE 1

| Substituents in Chemical Formula 1 | Siloxane polymer A | Siloxane polymer B |
|---|---|---|
| A | $C_3H_6$ | $C_3H_6$ |
| B | $C_3H_6$ | $C_3H_6$ |
| Z | *-(-CH$_2$-C$_6$H$_{10}$-CH(CH$_3$)-CH$_2$-)-* | *-(-CH$_2$-C$_6$H$_{10}$-CH(CH$_3$)-CH$_2$-)-* |
| $R_1$~$R_8$ | $CH_3$ | $CH_3$ |
| X | $OCH_3$ | $OCH_3$ |
| Y | $OCH_3$ | $OCH_3$ |
| m + n | 20 | 60 |

TABLE 2

| Substituents in Chemical Formula 1 | Siloxane polymer C | Siloxane polymer D |
|---|---|---|
| A | $C_3H_6$ | $C_3H_6$ |
| B | $C_3H_6$ | $C_3H_6$ |
| Z | *-(-CH$_2$-CH(CH$_3$)-CH(CH$_3$)-CH$_2$-)-* | *-(-CH$_2$-CH$_2$-CH$_2$-CH$_2$-CH$_2$-CH$_2$-)-* |
| $R_1$~$R_8$ | $CH_3$ | $CH_3$ |
| X | $OCH_3$ | $OCH_3$ |
| Y | $OCH_3$ | $OCH_3$ |
| m + n | 20 | 60 |

TABLE 3

| Substituents in Chemical Formula 1 | Siloxane polymer E | Siloxane polymer F |
|---|---|---|
| A | $C_3H_6$ | $C_3H_6$ |
| B | $C_3H_6$ | $C_3H_6$ |

TABLE 3-continued

| Substituents in Chemical Formula 1 | Siloxane polymer E | Siloxane polymer F |
|---|---|---|
| Z | *—(—CH$_2$—CH$_2$—CH$_2$—CH$_2$—CH$_2$—CH$_2$—)—* | (—CH$_2$—C$_6$H$_4$—CH$_2$—) |
| $R_1$~$R_8$ | CH$_3$ | CH$_3$ |
| X | OCH$_3$ | OCH$_3$ |
| Y | OCH$_3$ | OCH$_3$ |
| m + n | 20 | 60 |

A siloxane polymer according to Examples A-F is prepared through two stages wherein monohydroxyaryl siloxane is synthesized by reacting a hydride terminated siloxane with a phenol derivative in the presence of catalyst (Pt) in a first stage; and then reacting the monohydroxyaryl siloxane and a diene in a second stage.

EXAMPLES 1-11 AND COMPARATIVE EXAMPLES 1-6

Example 1

After adding 130 ml of 9.1% NaOH aqueous solution, 2,2-bis(4-hydroxyphenyl)propane (BPA) (21.1 g, 92.4 mmol), methyltributyl ammonium chloride (1.3 g, 5.3 mmol), 150 ml of methylene chloride, this mixture is strongly stirred. While maintaining the temperature of the solution at 20 to 25° C., 50 ml of methylene chloride solution, in which triphosgene (10.1 g, 101.7 mmol) is dissolved, is added. The mixture is stirred for 10 min. while maintaining the pH at 6 to 7. After that, siloxane polymer A (14.3 g, 6.9 mmol) which is dissolved into 15 ml of methylene chloride is added. This mixture is stirred for 10 min. while maintaining the pH at 10 to 12 by adding 50% NaOH. After that, 2,2-bis(4-hydroxyphenyl) propane (BPA) (84.7 g, 371.0 mmol), water, and 150 ml of methylene chloride are added followed by stirring for 1 hour. Into this mixture, trimethylamine (1.0 g, 9.9 mmol) and paracumylphenol (3.8 g, 17.9 mmol) are added. This mixture is again stirred while adding 200 ml of methylene chloride solution in which triphosgene (40.7 g, 411.6 mmol) is dissolved slowly into the reactor for 1 hour while maintaining the pH of the solution at 10 to 12 by adding 50% NaOH. After completing the stirring, the organic layer is separated by stirring the mixture for 1 hour, 200 ml of 10% HCl solution is added to neutralize the solution and then washing operation is carried out by water until the pH becomes neutral. After washing, a part of the solvent from the organic layer is removed. The polymer is precipitated using methanol. This precipitate is filtered and dried to obtain a powder form polymer. DOSY analysis for this polymer confirms that silicone polymer is bound inside the main chain of polycarbonate. The Si content is analyzed as 2.5 wt % with 1H NMR. GPC analysis result show that cMw contents as 21,248.

Example 2

Example 2 is conducted in the same manner as Example 1 except for using polysiloxane B (13.1 g, 2.6 mmol). DOSY analysis for this polymer confirms that siloxane polymer is bound inside the main chain of polycarbonate. The Si content is analyzed as 2.6 wt % with 1H NMR. cMw contents using GPC is found to be 21,169.

Example 3

Example 3 is conducted in the same manner as Example 1 except for using polysiloxane C (13.9 g, 6.6 mmol). DOSY analysis for this polymer confirms that siloxane polymer is bound inside the main chain of polycarbonate. The Si content is analyzed as 2.6 wt % with 1H NMR. cMw contents using GPC is found to be 25,609.

Example 4

Example 4 is conducted in the same manner as Example 1 except for using polysiloxane D (5.0 g, 2.5 mmol). DOSY analysis for this polymer confirms that siloxane polymer is bound inside the main chain of polycarbonate. The Si content is analyzed as 1.2 wt % with 1H NMR. cMw contents using GPC is found to be 22,565.

Example 5

Example 5 is conducted in the same manner as Example 1 except for using polysiloxane D (12.7 g, 6.3 mmol). DOSY analysis for this polymer confirms that siloxane polymer is bound inside the main chain of polycarbonate. The Si content is analyzed as 2.7 wt % with 1H NMR. cMw contents using GPC is found to be 22,117.

Example 6

Example 6 is conducted in the same manner as Example 1 except for using polysiloxane D (18.9 g, 9.4 mmol). DOSY analysis for this polymer confirms that siloxane polymer is bound inside the main chain of polycarbonate. The Si content is analyzed as 3.9 wt % with 1H NMR. cMw contents using GPC is found to be 22,732.

Example 7

Example 7 is conducted in the same manner as Example 1 except for using polysiloxane E (11.02 g, 3.15 mmol). DOSY analysis for this polymer confirms that siloxane polymer is bound inside the main chain of polycarbonate. The Si content is analyzed as 2.4 wt % with 1H NMR. cMw contents using GPC is found to be 23,754.

Example 8

Example 8 is conducted in the same manner as Example 1 except for using polysiloxane E (14.7 g, 4.19 mmol). DOSY analysis for this polymer confirms that siloxane polymer is bound inside the main chain of polycarbonate. The Si content is analyzed as 3.2 wt % with 1H NMR. cMw contents using GPC is found to be 22,538.

Example 9

Example 9 is conducted in the same manner as Example 1 except for using polysiloxane E (18.2 g, 5.2 mmol). DOSY analysis for this polymer confirms that siloxane polymer is bound inside the main chain of polycarbonate. The Si content is analyzed as 4.8 wt % with 1H NMR. cMw contents using GPC is found to be 20,841.

Example 10

Example 10 is conducted in the same manner as the example 1 except for using polysiloxane F (14.4 g, 6.9 mmol). DOSY analysis for this polymer confirms that siloxane polymer is bound inside the main chain of polycarbonate. The Si content is analyzed as 2.5 wt % with 1H NMR. cMw contents using GPC is found to be 21,645.

Example 11

The polymer obtained from Example 8 and SC-1190 (BPA-PC) from Cheil Industries are mixed at a weight ratio of 50:50.

Comparative Example 1

After melting 2,2-bis(4-hydroxyphenyl)propane (BPA) (45.66 g, 200 mmol) into 400 ml of 9.1% NaOH aqueous solution, 200 ml of methylene chloride is added. This mixture is strongly stirred and 250 ml of methylene chloride solution in which triphosgene (22.95 g, 77.3 mmol) is dissolved is slowly added for 1 hour while maintaining the solution temperature at 20 to 25° C. Para-cumylphenol (0.99 mmol) is added and strongly stirred for 5 min. Then, triethylamine (0.28 g, 2 mmol) is added into the solution and stirred again for one and a half hours while maintaining the pH of the solution higher than 11 with 50% NaOH solution. The organic layer of the solution is separated and neutralized by adding 200 ml of 10% HCl and washed with water till the pH of the solution is neutral. After washing, a part of the solvent from the organic layer is removed. The polymer is precipitated using methanol. This precipitate is filtered and dried to obtain powder form polymer. GPC analysis result confirms that the cMw of polymer is 21,920.

Comparative Example 2

Polycarbonate SC-1100 from Cheil Industries is used for this example.

Comparative Example 3

10% of JN100 from SJ Chemical as a copolyester and polycarbonate SC-1100 from Cheil Industries are blended to prepare this example.

Comparative Example 4

20% of JN100 from SJ Chemical as a copolyester and polycarbonate SC-1100 from Cheil Industries are blended to prepare this example.

Comparative Example 5

30% of JN100 from SJ Chemical as a copolyester and polycarbonate SC-1100 from Cheil Industries are blended to prepare this example.

Comparative Example 6

40% of JN100 from SJ Chemical as a copolyester and polycarbonate SC-1100 from Cheil Industries are blended to prepare this example.

Physical Characteristics of Polymer (1) Preparation of Specimen

After drying the prepared polymer by the methods in Examples 1-11 and Comparative Examples 1-6 at 120° C. for 4 hours, the polymer is injection molded at a forming temperature of 290° C. and a mold temperature of 70° C. inside a 10 oz injection molding machine to prepare a specimen of thickness 3 mm.

(2) Test for Impact Resistance

Notched Izod specimens of thickness ⅛" and ¼' are prepared as per ASTM D256 and tested at 25° C. and −30° C., respectively.

(3) Test for Chemical Resistance

Dumbbell shaped specimens as per ASTM No. 1 are immersed into gasoline for seven days and the changes in the tensile strength are assessed.

(4) Haze and Permeability

Hazes and permeability are measured for specimens with a thickness of 3 mm using a Haze Meter (YDPO2-0D, NIPPON DENSHOKU).

The measured physical properties for the specimens of Examples 1-11 and Comparative Examples 1-6 are presented in Table 4.

TABLE 4

|  | Si contents (wt %) | Molecular wt. (Mw) | Haze (%) | Permeability (%) | ¼" Izod impact strength (room temp.) | ⅛" Izod impact strength (RT) | ⅛" Izod impact strength (−30° C.) | Retention rate of tensile strength after immersing into gasoline (%) |
| --- | --- | --- | --- | --- | --- | --- | --- | --- |
| Example 1 | 2.5 | 21,248 | 3.7 | 89.2 | 70.9 | 91.6 | 68.5 | 78 |
| Example 2 | 2.6 | 21,169 | 4.2 | 88.0 | 71.5 | 92.0 | 69.5 | 80 |
| Example 3 | 2.6 | 25,609 | 2.84 | 88.7 | 72.8 | 92.6 | 70.6 | 82 |
| Example 4 | 1.2 | 22,565 | 0.85 | 91.5 | 68.3 | 90.2 | 68.5 | 93 |
| Example 5 | 2.7 | 22,117 | 1.17 | 90.5 | 72.3 | 91.9 | 73.5 | 97 |
| Example 6 | 3.9 | 22,732 | 2.85 | 89.2 | 89.5 | 95.9 | 78.5 | 99 |
| Example 7 | 2.4 | 23,754 | 2.25 | 89.9 | 71.8 | 92.1 | 71.5 | 95 |
| Example 8 | 3.2 | 22,538 | 3.75 | 89.5 | 83.5 | 93.7 | 74.2 | 98 |
| Example 9 | 4.8 | 20,841 | 4.65 | 89.0 | 92.7 | 97.1 | 79.6 | 99 |
| Example 10 | 2.5 | 21,645 | 1.92 | 92.0 | 71.2 | 91.0 | 70.3 | 99 |

TABLE 4-continued

|  | Si contents (wt %) | Molecular wt. (Mw) | Haze (%) | Permeability (%) | ¼" Izod impact strength (room temp.) | ⅛" Izod impact strength (RT) | ⅛" Izod impact strength (−30° C.) | Retention rate of tensile strength after immersing into gasoline (%) |
|---|---|---|---|---|---|---|---|---|
| Example 11 | 1.5 | 23,892 | 1.02 | 90.7 | 67.5 | 89.8 | 66.5 | 93 |
| Comparative example 1 | 0 | 21,920 | 0.50 | 90.3 | 5.1 | 75.9 | 7.5 | 51 |
| Comparative example 2 | 0 | 26,800 | 0.95 | 90.1 | 12.1 | 92.1 | 15.5 | 62 |
| Comparative example 3 | 0 | 26,800 | 0.92 | 90.1 | 6.5 | 60.5 | 10.7 | 83 |
| Comparative example 4 | 0 | 26,800 | 0.90 | 90.3 | 5.9 | 55.3 | 8.8 | 90 |
| Comparative example 5 | 0 | 26,800 | 0.90 | 90.6 | 5.1 | 52.3 | 7.8 | 91 |
| Comparative example 6 | 0 | 26,800 | 0.88 | 90.6 | 4.9 | 52.3 | 7.0 | 93 |

As can be seen from the above Table 4, Examples 1-11 including a polycarbonate resin of the present invention can maintain excellent impact strength, chemical resistance, and high transparency.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin comprising a repeating unit of the following Chemical Formula 1 in its main chain:

<Chemical Formula 1>

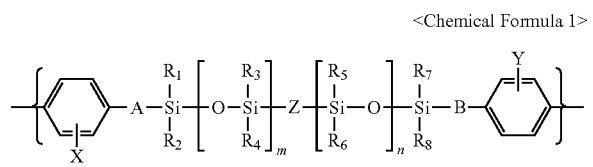

wherein, in Chemical Formula 1,
$R_1$ to $R_8$ are the same or different and are each independently substituted or unsubstituted $C_1$-$C_{10}$ alkyl or substituted or unsubstituted $C_6$-$C_{18}$ aryl, wherein the substituted $C_1$-$C_{10}$ alkyl or substituted $C_6$-$C_{18}$ aryl is substituted by $C_1$-$C_{10}$ alkyl, $C_6$-$C_{18}$ aryl, halogen, $C_1$-$C_{10}$ alkoxy, or a combination thereof;
A and B are the same or different and are each independently $C_1$-$C_{10}$ alkylene, $C_6$-$C_{18}$ arylene, —O—, or —S—;
Z is substituted or unsubstituted $C_1$-$C_{18}$ alkylene, substituted or unsubstituted $C_6$-$C_{18}$ cycloalkylene, or substituted or unsubstituted $C_6$-$C_{18}$ arylene;
X and Y are the same or different and are each independently hydrogen, halogen, $C_1$-$C_{18}$ alkoxy, $C_1$-$C_{10}$ alkyl, or $C_6$-$C_{18}$ aryl; and
n and m are positive integers, wherein n+m is an integer from 8 to 100.

2. The polycarbonate resin of claim 1, comprising the repeating unit of Chemical Formula 1 in an amount of about 1 to about 20% by weight based on the total weight of the polycarbonate resin.

3. The polycarbonate resin of claim 1, comprising Si in an amount of about 0.3 to about 10% by weight based on the total weight of the polycarbonate resin.

4. The polycarbonate resin of claim 1, comprising the repeating unit of Chemical Formula 1 in an amount of about 1 to about 20% by weight based on the total weight of the polycarbonate resin and further comprising Si in an amount of about 0.3 to about 10% by weight based on the total weight of the polycarbonate resin.

5. The polycarbonate resin of claim 1, comprising the repeating unit of Chemical Formula 1 in an amount of about 2.8 to about 3.4% by weight based on the total weight of the polycarbonate resin.

6. The polycarbonate resin of claim 1, comprising Si in an amount of about 4.7 to about 4.9% by weight based on the total weight of the polycarbonate resin.

7. The polycarbonate resin of claim 1, comprising the repeating unit of Chemical Formula 1 in an amount of about 2.3 to about 2.5% by weight based on the total weight of the polycarbonate resin and further comprising Si in an amount of about 5.5 to about 7.0% by weight based on the total weight of the polycarbonate resin.

8. The polycarbonate resin of claim 1, wherein Z is $C_1$-$C_{12}$ alkylene optionally substituted with $C_6$-$C_{18}$ arylene in the chain thereof.

9. The polycarbonate resin of claim 1, wherein Z is linear $C_1$-$C_{18}$ alkylene.

10. The polycarbonate resin of claim 1, wherein m is an integer having a value of 1 to 60, and n is an integer having a value of 1 to 60.

11. A thermoplastic resin composition comprising a polycarbonate resin of claim 1.

12. The thermoplastic resin composition of claim 11, wherein Z is $C_6$-$C_{12}$ cycloalkylene, and wherein a specimen formed thereof having a thickness of ¼" has a notched IZOD impact strength of about 60 to about 90 kgf·cm/cm measured in accordance with ASTM D256 is from.

13. The thermoplastic resin composition of claim 11, wherein Z is $C_1$-$C_{10}$ alkylene, and wherein a specimen formed thereof having a thickness of 2.5 mm has a Haze (Hz) measured by a Haze meter of about 0.1 to about 10%, and a Total Transmitted Light (TT) is about 85 to about 99%.

14. The thermoplastic resin composition of claim 11, wherein Z is $C_6$-$C_{18}$ arylene, and wherein a dumbbell shaped test specimen exhibits a change in tensile strength before and after immersing into gasoline for seven days of about 0 to about 25% measured in accordance with ASTM No. 1.

15. A molded product prepared from the thermoplastic resin composition of claim 11.

16. The polycarbonate resin composition of claim 11, further including a polycarbonate resin that does not include Si.

17. The polycarbonate resin composition of claim 16, comprising the polycarbonate resin of claim 1 that includes Si and the polycarbonate resin that does not include Si in a weight ratio of about 40:60 to about 60:40.

* * * * *